US009260089B2

(12) United States Patent
Schuler et al.

(10) Patent No.: US 9,260,089 B2
(45) Date of Patent: Feb. 16, 2016

(54) METHOD FOR CONTROLLING A DECELERATION ARRANGEMENT OF A MOTOR VEHICLE

(75) Inventors: Ralf Schuler, Plochingen (DE); Fanny Kobiela, Walheim (DE); Rupert Stuetzle, Berlin (DE)

(73) Assignee: Robert Bosch GmbH, Stuttgart (DE)

( * ) Notice: Subject to any disclaimer, the term of this patent is extended or adjusted under 35 U.S.C. 154(b) by 49 days.

(21) Appl. No.: 14/241,725

(22) PCT Filed: Aug. 10, 2012

(86) PCT No.: PCT/EP2012/065693
§ 371 (c)(1),
(2), (4) Date: Aug. 1, 2014

(87) PCT Pub. No.: WO2013/029966
PCT Pub. Date: Mar. 7, 2013

(65) Prior Publication Data
US 2014/0350814 A1    Nov. 27, 2014

(30) Foreign Application Priority Data
Aug. 29, 2011    (DE) .......................... 10 2011 081 724

(51) Int. Cl.
*B60T 7/12* (2006.01)
*B60T 1/10* (2006.01)
(Continued)

(52) U.S. Cl.
CPC ... *B60T 7/12* (2013.01); *B60T 1/10* (2013.01); *B60W 10/08* (2013.01); *B60W 10/188* (2013.01);
(Continued)

(58) Field of Classification Search
CPC ... B60T 1/10; B60T 2220/02; B60T 2270/60; B60T 7/12; B60W 30/18127; B60W 2550/20; B60W 10/08; B60W 10/188; B60W 2540/10; B60W 2540/106; B60W 50/10

USPC .......................................................... 701/70
See application file for complete search history.

(56) References Cited

U.S. PATENT DOCUMENTS 5,251,680 A * 10/1993 Minezawa ......... B60K 31/0008
180/169
6,076,899 A    6/2000 Isella
(Continued)

FOREIGN PATENT DOCUMENTS

DE    19533829    9/1996
DE    19607823    8/1997
(Continued)

OTHER PUBLICATIONS

International Search Report for Application No. PCT/EP2012/065693 dated Nov. 2, 2012 (English Translation, 2 pages).

*Primary Examiner* — Mary Cheung
*Assistant Examiner* — Atul Trivedi
(74) *Attorney, Agent, or Firm* — Michael Best & Friedrich LLP

(57) ABSTRACT

The invention relates to a method for controlling a deceleration arrangement (10) of a motor vehicle with at least one regenerative braking device (12) which is designed to decelerate the motor vehicle by means of a variable braking torque and to generate electrical energy corresponding to the braking torque. A return speed of an operating element for driving the motor vehicle, in particular an accelerator pedal (22), is detected (S2). A predefined braking torque is exerted (S5) by the regenerative braking device (12) if the return speed and/or a variable correlating thereto exceed(s) or fall(s) below a predefined threshold value.

17 Claims, 2 Drawing Sheets

(51) Int. Cl.
*B60W 30/18* (2012.01)
*B60W 50/10* (2012.01)
*B60W 10/08* (2006.01)
*B60W 10/188* (2012.01)

(52) U.S. Cl.
CPC ......... *B60W 30/18127* (2013.01); *B60W 50/10* (2013.01); *B60T 2220/02* (2013.01); *B60T 2270/60* (2013.01); *B60W 2540/10* (2013.01); *B60W 2540/106* (2013.01); *B60W 2550/20* (2013.01)

(56) References Cited

U.S. PATENT DOCUMENTS

| | | | | |
|---|---|---|---|---|
| 7,400,964 B2* | 7/2008 | Shiiba | B60K 31/0008 | 303/152 |
| 8,634,939 B2* | 1/2014 | Martin | B60W 30/18136 | 180/165 |
| 8,712,616 B2* | 4/2014 | Treharne | B60L 1/003 | 180/65.265 |
| 8,744,712 B2* | 6/2014 | Tashiro | B60L 7/18 | 303/152 |
| 2001/0024062 A1* | 9/2001 | Yoshino | B60K 6/48 | 303/152 |
| 2003/0184152 A1* | 10/2003 | Cikanek | B60K 6/48 | 303/152 |
| 2004/0251064 A1* | 12/2004 | Imai | B60K 6/442 | 180/65.23 |
| 2005/0231144 A1* | 10/2005 | Takano | B60L 7/006 | 318/376 |
| 2005/0255965 A1* | 11/2005 | Tao | B60T 1/10 | 477/4 |
| 2005/0256627 A1* | 11/2005 | Sah | B60T 7/12 | 701/70 |
| 2006/0055240 A1* | 3/2006 | Toyota | B60K 6/40 | 303/152 |
| 2006/0102394 A1* | 5/2006 | Oliver | B60K 6/12 | 180/65.24 |
| 2008/0100129 A1* | 5/2008 | Lubbers | B60K 6/48 | 303/113.1 |
| 2008/0314663 A1* | 12/2008 | Yamazaki | B60K 6/448 | 180/165 |
| 2009/0043470 A1* | 2/2009 | Ahn | B60W 10/04 | 701/70 |
| 2009/0118885 A1* | 5/2009 | Heap | B60W 10/06 | 701/22 |
| 2009/0118918 A1* | 5/2009 | Heap | B60K 6/365 | 701/54 |
| 2009/0118920 A1* | 5/2009 | Heap | B60K 6/365 | 701/54 |
| 2009/0118946 A1* | 5/2009 | Heap | B60K 6/445 | 701/55 |
| 2009/0118947 A1* | 5/2009 | Heap | B60K 6/445 | 701/55 |
| 2009/0118948 A1* | 5/2009 | Heap | B60K 6/445 | 701/55 |
| 2009/0118957 A1* | 5/2009 | Heap | B60K 6/365 | 701/70 |
| 2009/0150035 A1* | 6/2009 | Soliman | B60K 6/442 | 701/54 |
| 2009/0159351 A1* | 6/2009 | Ando | B60K 6/445 | 180/65.265 |
| 2009/0234528 A1* | 9/2009 | Crombez | G07C 5/0825 | 701/31.4 |
| 2009/0298641 A1* | 12/2009 | Boot | B60W 10/06 | 477/4 |
| 2011/0303498 A1* | 12/2011 | Crombez | B60L 7/18 | 188/106 P |
| 2012/0022735 A1* | 1/2012 | Tashiro | B60L 7/18 | 701/22 |
| 2013/0162009 A1* | 6/2013 | Mitts | B60L 3/102 | 303/3 |
| 2015/0202965 A1* | 7/2015 | Gabor | B60L 7/18 | 701/70 |

FOREIGN PATENT DOCUMENTS

| | | |
|---|---|---|
| DE | 19758782 | 6/2006 |
| DE | 102005002265 | 8/2006 |
| DE | 102010004846 | 3/2011 |
| DE | 102010027348 | 8/2011 |
| FR | 2945243 | 11/2010 |
| JP | S50158018 | 12/1975 |
| JP | H11115545 | 4/1999 |
| JP | 2000134713 | 5/2000 |
| JP | 2011121580 | 6/2001 |
| JP | 2007276498 | 10/2007 |
| JP | 2008131093 | 6/2008 |
| WO | 9924283 | 5/1999 |

\* cited by examiner

METHOD FOR CONTROLLING A DECELERATION ARRANGEMENT OF A MOTOR VEHICLE

BACKGROUND OF THE INVENTION

The invention relates to a method for controlling a deceleration arrangement of a motor vehicle, as well as a control device that is designed to carry out such a method.

It is already known for hybrid vehicles or purely electrically driven vehicles to recover kinetic energy during braking processes by generator mode operation of the electrical machine and to charge a battery with said energy (regenerative braking) Here the electrical machine produces a negative drive torque, i.e. it operates as a generator. In the case in which the electrical machine is neither producing a positive nor a negative driving torque, the motor vehicle is not driven forwards and is only accelerated or decelerated because of external influences (e.g. air resistance, rolling resistance, road gradient) (said phenomenon is referred to in the English literature as "freewheeling"). In the case of negative driving torque the regenerative braking torque can be regulated as the degree of deceleration of the vehicle, which is perceptible by the driver.

In modern motor vehicles various operating concepts are known in which the electrical machine is operated as a generator. E.g. vehicles are known in which recovery is carried out in steps of fixed specified sizes. If the gas pedal is released regenerative braking is initiated for a specified drive torque (this depends on e.g. the driving mode, which e.g. can be a sports, a comfort or an environmentally friendly driving mode).

Motor vehicles are also known, in which the regenerative braking torque can be manually adjusted by the driver using switches. The regenerative braking torque is set when releasing the gas pedal (if the brake pedal is not operated). Regenerative braking is only initiated if the gas pedal is fully released. In the event of brake pedal operation the regenerative torque is additionally increased until the predefined regeneration braking torque is reached. From a specified brake pedal travel, moreover, a hydraulic brake is activated, which further increases the braking torque (additively).

Finally, motor vehicles are known, with which the regenerative braking already starts before the complete release of the gas pedal. This causes the motor vehicle to coast at a certain pedal position (i.e. the electrical machine is neither generating a positive nor a negative drive torque), and the driver can regulate the degree of the regeneration intensity by means of adjusting smaller gas pedal positions. The exact gas pedal travel at which the motor vehicle coasts can be speed-dependent here. At higher speeds said point lies at a higher gas pedal position. The reason for this is that the maximum drive torques and regeneration torques vary depending on the revolution rate and hence depending on the speed. At higher speed, frictional losses in the electrical machine have to be increasingly compensated. The consequence for the driver is that he has a longer gas pedal travel available at higher speeds for regulating the level of the regenerative braking.

Because the highest possible efficiency is to be achieved during regenerative braking and when driving the motor vehicle by means of the electrical machine, the electrical-regenerative brake is connected to one of more axles of the motor vehicle. With such an arrangement minimal friction and hence the highest possible efficiency are achieved. In other words the electrical-regenerative brake only acts upon that axle, e.g. the front axle, which is also being driven by the electrical machine. Depending on the braking situation an unbalanced and hence non-ideal distribution of the braking torques on the individual axles can occur. For example, the braking torque can act on the respective axles in a ratio that is not proportional to the respective weights on the individual axles. An unbalanced brake force distribution in turn can adversely affect the driving dynamics or the controllability of the motor vehicle. For vehicles with a regenerative deceleration arrangement, particularly strong effects on driving stability are to be reckoned with because of the desire to recover the maximum amount of braking energy. In other words there is a conflict of aims between a very high level of energy recovery by regenerative braking on the one hand and a high level of driving stability during the braking process on the other hand.

SUMMARY OF THE INVENTION

According to the invention a method is provided for controlling a deceleration arrangement of a motor vehicle with at least one regenerative braking device. The regenerative braking device is designed to decelerate a motor vehicle by means of a variable braking torque and to generate electrical energy according to the braking torque. With the method according to the invention, the speed of return of an operating element for driving the motor vehicle, especially a gas pedal, is detected. With the method according to the invention, moreover, a predefined braking torque is exerted by the regenerative braking device if the speed of return and/or a variable correlated therewith exceeds or falls below a certain threshold value.

Furthermore, according to the invention a control device for carrying out such a method is provided.

The motor vehicle is especially an electric vehicle. The term "electric vehicle" refers within the wording of this text e.g. exclusively to vehicles driven by electrical energy as well as to hybrid vehicles, which comprise combinations of electric motors with internal combustion engines or fuel cells. The term "gas pedal" refers to an operating element that a driver operates and thereby can adjust the speed or the acceleration of the vehicle.

With the invention a maximum possible efficiency is achieved. The driver can initiate the regeneration mode by releasing the gas pedal and thus does not have to operate an additional operating element to activate the regeneration mode. Improved operating comfort can be provided in this way without an additional operating element.

According to one configuration of the method according to the invention, the predefined braking torque is determined according to a driving situation of the motor vehicle.

In this way the control or regulation algorithms of a control device according to the invention that is implementing the method can be optimally adapted to the specified boundary conditions or the specific driving situation of the motor vehicle.

With one embodiment of the method according to the invention the motor vehicle is driven by an electric motor. The electric motor can be operated as a generator as a component of the regenerative braking device for decelerating the motor vehicle.

This means that a single electrical machine can be operated as a drive unit for driving the motor vehicle or as a generator for recovery of energy. Said dual function requires no additional equipment and thus reduces the installation space and the costs.

With one embodiment a maximum braking torque is generated by the regenerative braking device if the speed of return exceeds the predefined threshold value.

In this way, e.g. in emergency situations, if the gas pedal is returned very quickly the braking process is initiated rapidly and with maximum braking torque, whereby safety can be increased.

With one embodiment of the method according to the invention, no braking torque is generated by the regenerative braking device if the speed of return falls below a second predefined threshold value.

Thus e.g. in overrun mode of the motor vehicle, i.e. when coasting, a regeneration torque is inhibited, so that the released kinetic energy of the motor vehicle can be used for overcoming a longer coasting distance. Said conversion from one mechanical form of energy to a different mechanical form of energy has particularly high efficiency compared to the conversion of kinetic energy to electrical energy.

With one design of the method according to the invention, a braking torque is generated by the regenerative braking device for generating electrical energy if the speed of return is below the second predefined threshold value and an operating element for decelerating the motor vehicle, especially a brake pedal, is operated to brake the motor vehicle.

The operation of the brake pedal thus has a higher associated priority compared to gas pedal operation, so that in all cases the total braking effect intended by the driver is generated.

The first predefined threshold value can coincide with the second predefined threshold value. According to one embodiment of the method according to the invention, however, the second predefined threshold value is smaller than the first predefined threshold value.

In this way the range of gas pedal return speeds is divided into three sub-ranges. Different braking strategies, e.g. a regeneration-optimized and/or deceleration-optimized braking strategy, can be set up using the delineation between the individual ranges.

For example, the braking torque varies depending on a position of the operating element for driving the motor vehicle if the speed of return has a value between the first predefined threshold value and the second predefined threshold value.

In this way the driver can advantageously control the energy recovery behavior of the motor vehicle according to his wishes without an additional operating element.

This aspect is further based on the fact that a significantly higher speed of return of the gas pedal compared to a normal driving operation is assessed as a criterion for the existence of an emergency braking situation. For this purpose the method according to the invention is capable of initiating an automatic braking process at an early stage prior to the operation of the brake pedal. This ensures that in a hazardous situation no time is lost in building up braking torque.

With one embodiment of the method according to the invention the first threshold value and/or the second threshold value can especially be adjusted manually by the driver.

For example, the predefined braking torque can especially be manually adjusted by the driver.

The driver has as a result the option of influencing the driving dynamics state of the vehicle in order thereby to produce a certain driving behavior, e.g. a sporty or comfortable driving behavior.

With one design of the method according to the invention, a control device controls the deceleration arrangement depending on a user-specific profile stored in a memory. Thereby the control device is designed to be especially self-learning and the user-specific profile is updated based on control inputs by the driver.

Thus a long-term profile can be produced with which driver-specific control can be optimally designed.

According to one embodiment of the method according to the invention, surroundings identification is performed for detecting an obstruction in the surroundings of the motor vehicle. Here the predefined braking torque is determined taking into account the results of the surroundings detection.

The surroundings detection device can basically be designed as desired. For example, the surroundings detection device can comprise a magnetic sensor, with which a generated magnetic field is changed by an object to be detected and said change is measured. Further, ultrasound-based surroundings detection devices are prior art. For example, an approach of the motor vehicle to an object, e.g. a different motor vehicle, can be detected by the surroundings detection device and an impending collision can be prevented.

BRIEF DESCRIPTION OF THE DRAWINGS

It should be understood that features, properties and advantages of the method according to the invention also apply accordingly to the control device designed according to the invention.

DETAILED DESCRIPTION

Figure 1:
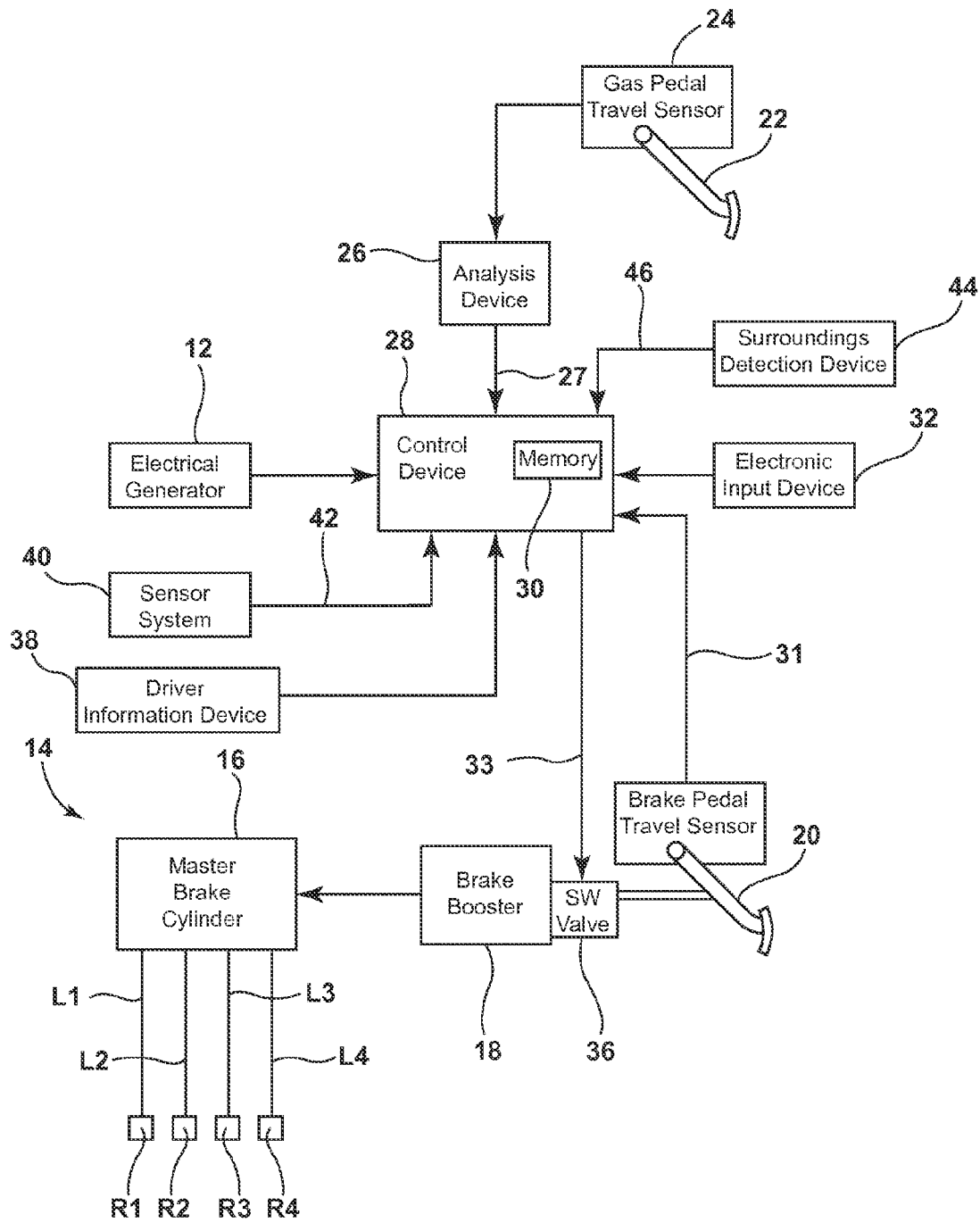
FIG. 1 shows a principle circuit diagram of a deceleration arrangement of a motor vehicle for carrying out the method according to the invention.

FIG. 1 shows a principle circuit diagram of a deceleration arrangement 10 for implementing the method according to the invention. The deceleration arrangement 10 is designed as a regenerative braking system, which also comprises, besides a frictional brake system 14, an electrical generator 12 and a control unit (inverter controller) for generating electrical energy. The generator 12 can e.g. be operated as a motor for driving the motor vehicle.

For example, only the two (not illustrated) front wheels or the front axle of the motor vehicle are/is connected to the generator 12. The total deceleration of the motor vehicle during a braking process is thereby composed of the deceleration components of the generator 12 and the frictional brake system 14.

The brake pressure required for the friction brakes R1, R2, R3, R4 is applied by means of a master brake cylinder 16 that is coupled to a brake pedal 20. For building up the brake pressure a brake medium is forced by the master brake cylinder 16 via suitable hydraulic lines L1, L2, L3, L4 to the individual friction brakes R1, R2, R3, R4. Here each friction brake R1, R2, R3, R4 is associated with a vehicle wheel. A brake booster 18 is disposed between the brake pedal 20 and the master brake cylinder 16 and boosts a pedal force applied by the driver to the brake pedal 20, e.g. by means of servo-pneumatically compressed air.

A position of a gas pedal 22 is detected by a gas pedal travel sensor 24 and forwarded to an analysis device 26. The analysis device 26 is designed to determine the gas pedal return speed from the detected position of the gas pedal 22. The analysis device 26 is connected on the output side via a data line 27 to a control device 28 for controlling an automatic braking process. The control device 28 can be designed to be self-learning. For this purpose a memory 30 is implemented in writeable form in the control device 28 or outside the same or in one embodiment even outside the vehicle, so that control programs for the control device 28 can be designed and loaded for the individual technical conditions. Here the program comprises self-learning algorithms. The control device 28 controls the deceleration devices 12, 14 depending on a user-specific profile stored in the memory 30. The control device 28 continuously updates the user-specific profile based on an analysis of certain control inputs (e.g. the release of the gas pedal 22) by the user. The control device 28 thus detects the behavior of the driver over a long period.

A signal for the pedal travel of the brake pedal 20 or a correlated variable is delivered to the control device 28 by means of a data line 31. The control device 28 can control a switching valve 36 of the brake booster 18 via the control line 33, so that a brake pressure can be built up independently of the operation of the brake pedal 20.

A driver information device 38, e.g. a display, provides the driver with information about the settings, e.g. manual settings, about the current status of the recovery performance and information about the operating concept, or information thereof for use for energy-saving driving. Of course the corresponding information is also made available in audible form.

Parameters that characterize a driving situation of the motor vehicle, such as e.g. driving dynamics parameters, are detected by means of a sensor system 40 comprising a plurality of sensors. The output signals of the sensor system 40 are transferred to the control device 28 via a communications line 42.

A surroundings detection device 44 is connected via a communications line 46 to the control device 28. The surroundings detection device 44 comprises e.g. a camera device for generating video signals, which are transmitted via the communications line 46 to the control device 28. Objects, such as a preceding vehicle or vehicles in front of the vehicle are detected there by means of an image processing unit on the basis of three-dimensional pattern recognition. If the control device 28 detects a critical traffic situation, e.g. an impending collision with another vehicle, it automatically controls the deceleration device 12, 14 taking into account the driving situation in order to decelerate the motor vehicle.

In a driving mode the analysis device 26 transfers the value of the speed of return $V_R$ of the gas pedal 22 determined by the analysis device 26 to the control device 28 by means of the data line 27. In the control device 28 the value of the speed of return $V_R$ is compared with an upper threshold value $S_o$ and with a lower threshold value $S_u$. If the value of the speed of return $V_R$ exceeds the upper threshold value $S_o$, the control device 28 controls the generator 12 and thereby causes it to carry out regenerative braking. The control device 28 thereby determines a predefined braking torque $B_{max}$, which is defined according to the driving situation detected by means of the sensor system 40. The predefined braking torque $B_{max}$ can also vary by increasing with time in order to achieve a more comfortable ride. The regenerative braking consists of the released kinetic energy of the vehicle being converted by the generator 12 into electrical energy. The electrical energy built up during regenerative braking is greater the greater the braking torque that has built up. The recovered electrical energy can be used for charging an accumulator or for supplying electrical loads depending on the strategy of the vehicle operation.

If the value of the speed of return $V_R$ falls below the lower threshold value $S_u$, the control device 28 causes the application of regenerative power only under the condition that the brake pedal 20 is operated for braking the motor vehicle. In other words, the control device assesses a hesitant release of the gas pedal 22 without a brake pedal operation as a criterion for the desire of the driver to allow the vehicle to coast.

If the value of the speed of return $V_R$ falls below the upper threshold value $S_o$ and at the same time exceeds a lower threshold value $S_u$, it can be concluded therefrom that there is neither a desire for greater deceleration nor the desire for coasting of the motor vehicle. Therefore in this case intuitively understandable control of the regenerative torque by the driver is achieved by operating the gas pedal 22. The control device 28 varies the regeneration torque for this purpose, e.g. depending on a position of the gas pedal 22, by a fixed specified torque or a using a different strategy.

In summary, for the method according to the invention the range of values of the speed of return $V_R$ of the gas pedal 22 is subdivided into three or more sub-ranges, in each of which a different operating concept is implemented, and specifically in a first sub-range with return speed values above the upper threshold value $S_o$ ($V_R > S_o$), a second sub-range in which the return speed values are between the upper threshold value $S_o$ and the lower threshold value $S_u$ ($S_u < V_R < S_o$) and in a third sub-range with return speed values below the lower threshold value $S_u$ ($V_R < S_u$). It should be understood that more than two sub-ranges of the return speed values in which different regeneration steps are implemented can also be defined.

By means of an electronic input device 32 the user can make manual adjustments of parameters, such as e.g. the maximum regeneration level or the values for the upper threshold value $S_o$ and/or the lower threshold value $S_u$. The parameter values thus adjusted by the user can for example be displayed on the display of the driver information device 38.

Figure 2:
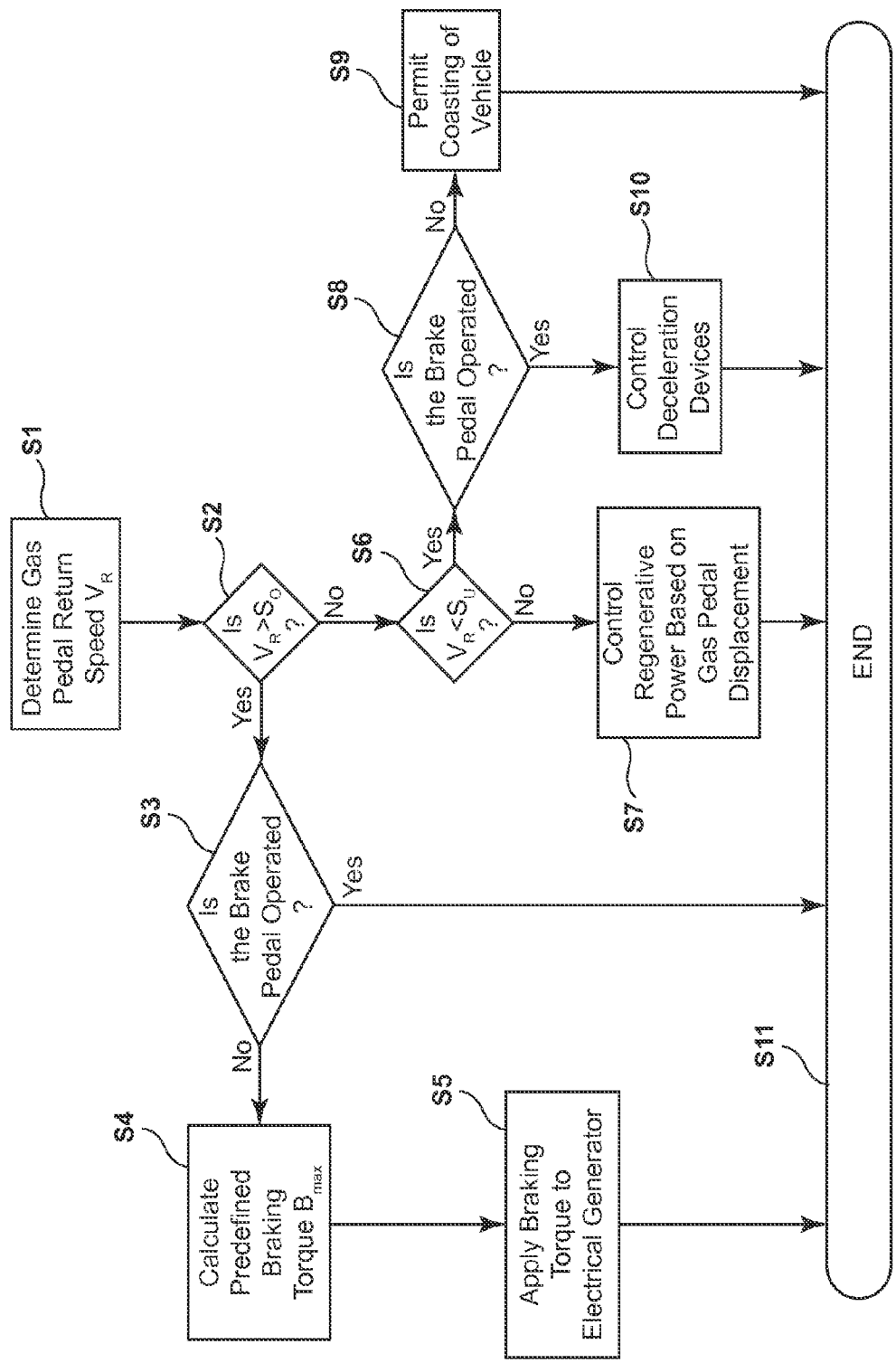
FIG. 2 shows a flow diagram of a method according to the invention.

FIG. 2 shows a flow diagram of an embodiment of a method according to the invention.

In a first step S1 a gas pedal return speed $V_R$ is determined by the analysis device 26. Following step S1 the method advances to step S2. In step S2 a check is made as to whether the gas pedal return speed $V_R$ is greater than or according to an alternative embodiment less than the specified upper threshold value $S_o$.

In the decision step S2 the method branches depending on whether the result is positive or negative. For a positive result in step S2 (i.e. the gas pedal return speed exceeds or alternatively is less than the upper threshold value $S_o$) the method proceeds with step S3. In step S3 a check is made as to whether the brake pedal 20 is being operated.

If it was determined in step S3 that the brake pedal 20 is not being operated, the method changes to step S4, otherwise the method terminates at end step S11.

In order to achieve the maximum possible energy recovery with simultaneous high driving stability according to the respective driving situation, in step S4 the predefined braking torque $B_{max}$ for the generator 12 is calculated according to a driving situation, because in non-critical driving situations a higher generator braking torque can be allowed or tolerated than for critical driving situations. The calculation of the predefined braking torque $B_{max}$ is performed by the control device 28. For calculation of the predefined braking torque $B_{max}$ from the current driving situation, one or more of the following parameters can be used and detected by means of the sensor system 40: The speed of the vehicle, the lateral accelerations of the motor vehicle, the yaw rate of the motor vehicle, the center of gravity position of the motor vehicle, coefficient of friction values of the road surface, coefficient of friction values of the tires, to name just a small selection. In addition properties of the vehicle such as the design of the chassis can be taken into account during the determination of the predefined braking torque $B_{max}$. Different computer operations known to the person skilled in the art between said parameters or influencing factors are thereby possible for calculation of the predefined braking torque $B_{max}$. A suitable determination of the predefined braking torque $B_{max}$ can alternatively also be performed using characteristic curves stored in the memory 30. With a motor vehicle comprising an electronic stability program (ESP) the signals of an already provided ESP sensor system can be analyzed to assess the current driving situation or driving dynamics.

Following step S4, i.e. after the calculation of the predefined braking torque $B_{max}$, the method advances to step S5. In step S5 the control device 28 sends corresponding control signals to the generator 12 for application of the determined predefined braking torque $B_{max}$ to the wheels or the vehicle axle. In other words the control device 28 passes the calculated predefined braking torque $B_{max}$ to the generator 12 in step S5.

Following step S5 the method is terminated by the end step S11.

In the event of a negative result in step S2 the method changes to step S6. In step S6 a check is made as to whether the speed of return $V_R$ is less than the lower threshold value $S_u$.

If the check result in step S6 is negative, it follows therefrom that the current value of the gas pedal return speed $V_R$ is in the range between the lower threshold value $S_u$ and the upper threshold value $S_o$. In this case the method changes to step S7.

In step S7 the regenerative power of the generator 12 varies e.g. depending on a position of the gas pedal 22. For example, a deflection range or displacement travel of the gas pedal 22 is divided into at least two ranges, a lower range and an upper range. In the lower range for a hybrid vehicle with a closed choke flap regenerative or recuperative braking is performed. The regenerative braking torque is controlled here by the pedal displacement. In the upper range the choke flap is controlled depending on the pedal displacement.

Following step S7 the method is terminated in the end step S11.

If the check result in step S6 is positive (i.e. the current value of the gas pedal return speed is less than the lower limit value $S_u$), the method jumps to step S8.

In step S8 a check is made as to whether the brake pedal 20 is being operated. If it is determined in step S8 that the brake pedal 20 is not being operated, the method changes to step S9. In step S9, coasting of the motor vehicle takes place without the application of a regenerative braking torque until the vehicle comes to rest.

Following step S9 the method is terminated at S11.

If it is determined in step S8 that the brake pedal is being operated, the method changes to step S10. In step S10 the deceleration devices 12, 14 are controlled, wherein the total deceleration is comprised of the deceleration components of the deceleration device 12, 14 and overall fulfills the driver's braking wishes.

Following step S10 the method is terminated in the end step S11.

The invention claimed is:

1. A method for controlling a deceleration arrangement of a motor vehicle with at least one regenerative braking device, which is designed to decelerate the motor vehicle at a variable braking torque and to generate electrical energy according to the braking torque, wherein a speed of return of an operating element for driving the motor vehicle is detected, wherein a predefined braking torque is exerted by the regenerative braking device when the speed of return and/or a variable correlated therewith exceeds a first predefined threshold value or the speed of return and/or a variable correlated therewith falls below a second predefined threshold value.

2. The method as claimed in claim 1, wherein the predefined braking torque is determined according to a driving situation of the motor vehicle.

3. The method as claimed in claim 1, wherein the motor vehicle is driven by an electric motor, which can be operated as a generator as a component of the regenerative braking device for decelerating the motor vehicle.

4. The method as claimed in claim 1, wherein a maximum braking torque is generated by the regenerative braking device when the speed of return exceeds the first predefined threshold value.

5. The method as claimed in claim 4, wherein the braking torque is varied depending on a position of the operating element for driving the motor vehicle when the speed of return has a value between the first predefined threshold value and the second predefined threshold value.

6. The method as claimed in claim 4, wherein the first threshold value and/or the second threshold value can be adjusted manually.

7. The method as claimed in claim 1, wherein no braking torque is generated by the regenerative braking device when the speed of return is below the second predefined threshold value and the brake pedal is not operated.

8. The method as claimed in claim 1, wherein a braking torque is generated by the regenerative braking device for generating electrical energy when the speed of return is below the second predefined threshold value and a brake pedal for braking the motor vehicle is operated.

9. The method as claimed in claim 1, wherein the second predefined threshold value is less than the first predefined threshold value.

10. The method as claimed in claim 1, wherein the predefined braking torque can be adjusted manually.

11. The method as claimed in claim 1, wherein a control device controls the deceleration arrangement depending on a user-specific profile stored in a memory, wherein the control device is designed to be self-learning and the user-specific profile is updated based on control inputs by the driver.

12. The method as claimed in claim 1, wherein surroundings detection is carried out for detecting an obstruction in the surroundings of the motor vehicle, wherein the predefined braking torque is determined taking into account the result of the surroundings detection.

13. The method as claimed in claim 1, wherein the operating element comprises a gas pedal.

14. A method for controlling a deceleration arrangement of a motor vehicle with at least one regenerative braking device comprising:
   detecting gas pedal return speed;
   when gas pedal return speed is greater than an upper threshold value and a brake pedal is not operated, calculating a braking torque and applying the braking torque with the electrical generator;
   when the gas pedal return speed is not greater than the upper threshold value and the gas pedal return speed is less than a lower threshold value, controlling regenerative power of the electrical generator based on gas pedal displacement; and
   when the gas pedal return speed is not greater than the upper threshold value and the gas pedal return speed is not less than the lower threshold value, and a brake pedal is operating, then controlling deceleration by controlling regenerative power of the electrical generator and operating a master brake cylinder.

15. The method as claimed in claim 14, including when the gas pedal return speed is not greater than the upper threshold value, the gas pedal return speed is not less than the lower threshold value, and the brake pedal is not operating, then permitting coasting of a motor vehicle without controlling regenerative power of the electrical generator.

16. The method as claimed in claim 14, wherein when the gas pedal return speed is greater than an upper threshold value and a brake pedal is not operated, the calculating of a braking torque and the applying of the braking torque with the electrical generator comprises calculating a maximum braking torque and applying the maximum braking torque with the electrical generator.

17. A method for controlling a deceleration arrangement of a motor vehicle with at least one regenerative braking device designed to decelerate the motor vehicle at a variable braking torque and to generate electrical energy according to the braking torque, comprising:
   detecting a speed of return of a gas pedal for driving the motor vehicle; and
   exerting a predefined braking torque with the regenerative braking device when the speed of return and/or a variable correlated therewith falls below a predefined lower threshold value or when the speed of return and/or a variable correlated therewith exceeds a predefined upper threshold value.

\* \* \* \* \*